(12) United States Patent
Yang et al.

(10) Patent No.: US 11,252,639 B2
(45) Date of Patent: Feb. 15, 2022

(54) METHOD AND DEVICE FOR TRANSMITTING SYSTEM INFORMATION

(71) Applicant: GUANGDONG OPPO MOBILE TELECOMMUNICATIONS CORP., LTD. OPPO, Guangdong (CN)

(72) Inventors: Ning Yang, Guangdong (CN); Yanan Lin, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 53 days.

(21) Appl. No.: 16/470,967

(22) PCT Filed: Dec. 22, 2016

(86) PCT No.: PCT/CN2016/111509
§ 371 (c)(1),
(2) Date: Jun. 18, 2019

(87) PCT Pub. No.: WO2018/112837
PCT Pub. Date: Jun. 28, 2018

(65) Prior Publication Data
US 2019/0394705 A1    Dec. 26, 2019

(51) Int. Cl.
*H04W 48/08* (2009.01)
*H04W 72/04* (2009.01)

(52) U.S. Cl.
CPC ......... *H04W 48/08* (2013.01); *H04W 72/042* (2013.01); *H04W 72/0446* (2013.01); *H04W 72/0453* (2013.01)

(58) Field of Classification Search
CPC ............ H04W 48/08; H04W 72/042; H04W 72/0446; H04W 72/0453
See application file for complete search history.

(56) References Cited

U.S. PATENT DOCUMENTS

| | | | |
|---|---|---|---|
| 8,270,332 B2 * | 9/2012 | Aoyama | H04W 4/06 370/312 |
| 8,274,959 B2 | 9/2012 | Lee et al. | |
| 2011/0171929 A1 | 7/2011 | Tamura et al. | |
| 2013/0044713 A1 * | 2/2013 | Suh | H04L 5/0048 370/329 |

(Continued)

FOREIGN PATENT DOCUMENTS

| CN | 101742572 A | 6/2010 |
|---|---|---|
| CN | 102026375 A | 4/2011 |

(Continued)

OTHER PUBLICATIONS

3GPP TSG RAN WG1 Meeting #87.

(Continued)

*Primary Examiner* — Duc C Ho
(74) *Attorney, Agent, or Firm* — Young Basile Hanlon & MacFarlane, P.C.

(57) ABSTRACT

A method and a device for transmitting system information are provided. The method includes: a network device determines a resource for sending the system information, and the network device sends the system information on the resource for sending the system information. The device for transmitting system information includes a transceiver, used for receiving system information on a configured first resource.

12 Claims, 4 Drawing Sheets

100

A network device determines a resource for sending system information ~ S110

The network device sends the system information on the resource for sending the system information ~ S120

(56) References Cited

U.S. PATENT DOCUMENTS

| | | | |
|---|---|---|---|
| 2014/0133365 A1* | 5/2014 | Peng | H04L 5/0092 370/278 |
| 2015/0036616 A1* | 2/2015 | Lee | H04L 5/0023 370/329 |
| 2016/0057562 A1 | 2/2016 | Fang et al. | |
| 2016/0338008 A1 | 11/2016 | Xia | |
| 2018/0110060 A1* | 4/2018 | Huang | H04W 72/1284 |

FOREIGN PATENT DOCUMENTS

| | | | |
|---|---|---|---|
| CN | 102378129 | A | 3/2012 |
| CN | 103888964 | A | 6/2014 |
| CN | 104348573 | A | 2/2015 |
| CN | 104602226 | A | 5/2015 |
| CN | 105122700 | A | 12/2015 |
| EP | 3026857 | A1 | 6/2016 |
| GN | 104980248 | A | 10/2015 |
| GN | 105208635 | A | 12/2015 |
| JP | 2014522618 | A | 9/2014 |
| RU | 2582078 | C2 | 4/2016 |
| RU | 2591660 | C2 | 7/2016 |
| WO | 2008044551 | A1 | 4/2008 |
| WO | 2010032477 | A1 | 3/2010 |
| WO | 2016070429 | A1 | 5/2016 |
| WO | 2016163071 | A1 | 10/2016 |

OTHER PUBLICATIONS

3GPP TSG-RAN WG2 Meeting #61.
Extended European Search Report for EP 16924351.6 dated Oct. 30, 2019.
SG First Written Opinion for SG Patent Application No. 11201905617R dated Jul. 8, 2020.
English Translation of the RU Notice of Allowance for RU Application No. 2019121867/07(042625) dated Jul. 29, 2020.
3GPP TSG-RAN WG2 #96; R2-167605; Reno, USA, Nov. 14-18, 2016; Principle/Guideline: Minimum SI TX in Damping Cell; pp. 1-3.
3GPP TSG-RAN2 Meeting #96; R2-167579; Further considerations on "Minimum SI"; pp. 1-3.
EP Examination Report for EP Application No. 16924351.6 dated Jul. 17, 2020.
English Translation of the second CN Office Action for CN Application No. 201680091736.1 dated Jul. 9, 2020.
English Translation of Second Chile Office Action for Chile Application No. 2019-001692 dated Sep. 4, 2020.
First Canadian Office Action for Canadian Application No. 3,047,480 dated Jul. 21, 2020.
English Translation of Russian Office Action for Russian Patent Application No. 2019121867 dated Apr. 17, 2020.
English Translation of Chinese Office Action for Chinese Patent Application No. 201680091736.1 dated Mar. 10, 2020.
English Translation of Chilean Office Action for Chilean Patent Application No. 201901692 dated Mar. 13, 2020.
Canada Second Office Action for CA Application 3047480 dated Jan. 29, 2021.
Communication pursuant to Article 94(3) EPC Examination for EP Application 16924351.6 dated Dec. 18, 2020.
India First Office Action for IN Application 201917024253 dated Dec. 22, 2020.
Japan First Office Action with English Translation for JP Application 2019-533019 dated Dec. 15, 2020.
3GPP TSG-RAN WG2 Meeting #95bis; Kaohsiung, Oct. 10-14, 2016; R2-167040.
3GPP TSG-RAN2 Meeting #95bis; Kaohsiung, Oct. 10-14, 2016; R2-166203.
China Notice of Refusal with English Translation for CN Application 201680091736.1 dated Dec. 30, 2020.
Israel First Office Action with English Translation for IL Application 267497 dated Jun. 6, 2021.
Communication pursuant to Article 94(3) EPC Examination for EP Application 16924351.6 dated Jun. 22, 2021.
Tawain First Office Action with English Translation for TW Application 106142299 dated May 17, 2021.
Indonesia First Office Action with English Translation for ID Application P00201906000 dated Jun. 15, 2021.
Third China Office Action with English Translation for CN Application 201680091736.1 dated Oct. 13, 2020.
Brazil Office Action with English Translation for BR Application BR112019012810-7 dated Sep. 9, 2020.
Australian Examination Report for AU Application 2016433293 dated Sep. 22, 2021. (4 pages).
Chile Office Action with English Translation for CL Application 2019001692 dated Sep. 2, 2021. (4 pages).
Chinese Office Action with English Translation for CN Application 2016800917361 dated Sep. 28, 2021. (25 pages).
Japanese Decision to Grant a Patent with English Translation for JP Application 2019533019 dated Sep. 24, 2021. (6 pages).
3GPP TSG-RAN2 Meeting #96 Reno, USA, R2-167480, OPPO, Discussion on Issues of Other SIs, Nov. 14-18, 2016.
Singapore Notice of Eligibility for Grant for SG Application 11201905617R dated Sep. 24, 2021. (5 pages).
Taiwan Office Action with English Translation for TW Application 106142299 dated Oct. 26, 2021. (7 pages).
Canadian Examination Report for CA Application 3047480 dated Nov. 16, 2021. (5 pages).
Chinese Notification of Reexamination with English Translation for CN Application 201680091736.1 dated Dec. 17, 2021.

* cited by examiner

100

A network device determines a resource for sending system information ~ S110

The network device sends the system information on the resource for sending the system information ~ S120

200

A terminal device receives system information on a configured first resource ~ S210

METHOD AND DEVICE FOR TRANSMITTING SYSTEM INFORMATION

CROSS-REFERENCE TO RELATED APPLICATION(S)

This application is a 371 application of International Application No. PCT/CN2016/111509, filed on Dec. 22, 2016, the entire disclosure of which is hereby incorporated by reference.

TECHNICAL FIELD

Implementations of the present disclosure relate to the communication field, in particular to a method and a device for transmitting system information in the communication field.

BACKGROUND

In the design of the Long Term Evolution (LTE) system, the bandwidth for a base station to send system information can only be applied to a terminal device for which the minimum bandwidth is applicable, which will cause the transmission of the system information to be limited by resources.

SUMMARY

Implementations of the present disclosure provide a method and a device for transmitting system information.

In a first aspect, a method for transmitting system information is provided. The method includes: determining a resource for sending the system information by a network device, and sending the system information on the resource for sending the system information by the network device.

Optionally, the network device can send the system information through broadcast and/or multicast and/or unicast.

Optionally, determining the resource for sending the system information by the network device may include expanding, by the network device, a current resource for sending system information to obtain an expanded resource, and determining the expanded resource as the resource for sending system information. Optionally, the network device can send a part of the system information on a current resource for sending system information and send a remaining part of the system information on an expanded resource.

Optionally, the system information may be all system information that the network device needs to send to at least one terminal device, or may be part of system information that the network device sends to the at least one terminal device. For example, the system information may be a Master Information Block (MIB) in the LTE. In other words, a resource determined by the network device may be used for sending part or all of system information, such as all or part of system information of System Information Block (SIB) 1, SIB 2, SIB 3, SIB 4, SIB 5, SIB 6, SIB 7, SIB 8, etc. in LTE. Optionally, the system information may be all or part of system information in a future communication system. The classification of system information in the future communication system may adopt the classification manner of system information in the LTE system, or may adopt other classification manners of system information. Implementations of the present disclosure are not limited thereto. The system information of the future communication system includes the content contained in the system information in the LTE, but is not limited to the content contained in the system information in the LTE, and may also include other content. Implementations of the present disclosure are not limited thereto.

In some implementations, before sending the system information on the resource for sending the system information by the network device, the method further includes: sending first indication information to at least one terminal device by the network device, wherein the first indication information is used for the at least one terminal device to determine the resource for sending the system information.

In some implementations, the first indication information is used for indicating location of the resource where the network device sends the system information, or the first indication information is used for indicating starting location of the resource where the network device sends the system information, and at least one of time domain width of a resource block and frequency domain width of the resource block.

Optionally, the first indication information which indicates the resource where the network device sends the system information may indicate locations of several resources, and the sizes of the locations of the several resources may vary. Optionally, the first indication information may indicate that the resource where the network device sends the system information is a specific resource selected from a set of resources. Implementations of the present disclosure are not limited thereto.

In an implementation of the present disclosure, the first indication information may be used to indicate the location of the resource where the network device sends the system information. The at least one terminal device determines, according to the resource where the network device sends the system information and which is indicated by the first indication information, the resource for receiving the system information. When the first indication information is used for indicating the starting location of the resource where the network device sends the system information, and at least one of the time domain width of the resource block and the frequency domain width of the resource block, the at least one terminal device can determine a time domain resource for receiving the system information according to the starting location of the resource and the time domain width of the resource block. The at least one terminal device can determine a frequency domain resource for receiving the system information according to the starting location of the resource and the frequency domain width of the resource block. The at least one terminal device can determine a time domain and frequency domain resource for receiving the system information according to the starting location of the resource, the time domain width of the resource block and the frequency domain width of the resource block.

In some implementations, the first indication information is further used for indicating a transmission periodicity for the network device to send the system information, and/or the first indication information is further used for indicating content information contained in the system information.

In some implementations, the first indication information is further used for indicating whether the at least one terminal device needs to receive the system information on the resource for sending the system information.

In an implementation of the present disclosure, when the first indication information indicates that the at least one terminal device needs to receive the system information on the resource for sending the system information, the at least one terminal device receives the system information. Specifically, the system information can be received according to the first indication information. When the first indication information indicates that the at least one terminal device does not need to receive the system information on the resource for sending the system information, the at least one terminal device does not receive the system information on the resource for sending the system information.

In some implementations, the first indication information is further used for indicating location of a resource where the network device sends control information of the system information, or the first indication information is used for indicating starting location of the resource where the network device sends control information of the system information, and at least one of time domain width of a resource block and frequency domain width of the resource block.

Optionally, the first indication information which indicates the resource where the network device sends the control information of the system information may indicate locations of several resources, and the sizes of the locations of the several resources may vary. Optionally, the first indication information may indicate that the resource where the network device sends the control information of the system information is a specific resource selected from a set of resources. Implementations of the present disclosure are not limited thereto.

In an implementation of the present disclosure, the first indication information may also indicate the resource where the network device sends the control information of the system information. In this way, the at least one terminal device receives, according to the indication of the first indication information, the control information of the system information on the resource for sending the control information of the system information. When the at least one terminal device receives the control information of the system information, the resource for receiving the system information can be determined according to a resource indicated by the control information of the system information, and then the system information can be received according to the determined resource for receiving the system information.

In some implementations, the control information of the system information is further used for indicating a transmission periodicity for the network device to send the system information, and/or the control information of the system information is further used for indicating content information contained in the system information sent by the network device.

In some implementations, the control information of the system information is further used for indicating whether the at least one terminal device needs to receive the system information on the resource for sending the system information. When the control information of the system information indicates that the at least one terminal device needs to receive the system information on the resource for sending the system information, the at least one terminal device receives the system information on the resource for sending the system information. When the control information of the system information indicates that the at least one terminal device does not need to receive the system information on the resource for sending the system information, the at least one terminal device does not need to receive the system information on the resource for sending the system information.

In some implementations, sending the first indication information to the at least one terminal device by the network device includes: sending the first indication information to the at least one terminal device by the network device through synchronization information.

In some implementations, determining the resource for sending the system information by the network device includes: determining the resource for sending the system information by the network device according to preconfigured information.

In an implementation of the present disclosure, the preconfigured information may be specified in a protocol or determined by negotiation between the network device and the at least one terminal device. Implementations of the present disclosure are not limited thereto.

In some implementations, the preconfigured information is used for indicating a calculation method of the resource where the network device sends the system information.

In other words, the network device calculates the resource, where the network device sends the system information, according to the method which is indicated by the preconfigured information and which is used for calculating the resource where the network device sends the system information.

In some implementations, the preconfigured information is used for indicating a calculation method of the resource where the network device sends control information of the system information.

In other words, the network device calculates the resource, where the network device sends the control information of the system information, according to the method which is indicated by the preconfigured information and which is used for calculating the resource where the network device sends the control information of the system information.

In some implementations, the system information includes second indication information, and the second indication information is used for indicating resources for the at least one terminal device to receive other system information than the system information.

In an implementation of the present disclosure, when the system information is part of the system information sent by the network device, the network device can indicate, in the system information, the resource for the remaining system information not sent to the at least one terminal device. In this way, the at least one terminal device receives the system information, determines the resource for the remaining system information according to the second indication information included in the system information. The other system information herein can be understood as the remaining system information that the network device has not sent to the at least one terminal device yet.

In some implementations, the second indication information is further used for indicating an order in which the at least one terminal device receives the other system information, and/or the second indication information is further used for indicating content information of the other system information.

In an implementation of the present disclosure, when the system information is part of the system information sent by the network device, the network device can indicate, in the system information through the second indication information, the transmission sequence for the remaining system information not sent to the at least one terminal device. In this way, when receiving the system information, the at least one terminal device determines the reception sequence for the remaining system information according to the second indication information included in the system information. The at least one terminal device receives the remaining system information according to the reception sequence. The other system information herein can be understood as the remaining system information that the network device has not sent to the at least one terminal device yet.

In some implementations, the system information is a master information block.

In an implementation of the present disclosure, if the system information is the master information block, since the master information block includes the most important system information, such as system bandwidth, system frame number, selection information, initial access information, etc. The master information block may also include information of a base station. In this way, the at least one terminal device can be ensured to normally receive the master information block.

Optionally, the master information block is further used for indicating whether the at least one terminal device needs to receive the remaining system information not sent by the network device, on the resource for sending the system information.

In a second aspect, a method for transmitting system information is provided. The method includes: receiving system information on a configured first resource by a terminal device.

Optionally, the terminal device receives the system information sent by the network device on a configured first resource.

Optionally, the system information may be all system information that the network device needs to send to the terminal device, or may be part of system information that the network device sends to the terminal device. For example, the system information may be an MIB. In other words, a resource determined by the network device may be used for sending part or all of system information, such as all or part of system information of SIB 1, SIB 2, SIB 3, SIB 4, SIB 5, SIB 6, SIB 7, SIB 8, etc. in LTE. Optionally, the system information may be all or part of system information in a future communication system.

In an implementation of the present disclosure, before receiving the system information on the configured first resource by the terminal device, the method further includes: receiving first indication information by the terminal device, and determining the first resource according to the first indication information by the terminal device.

Optionally, the terminal device can receive the first indication information through synchronization information.

Optionally, the terminal device can receive a part or all of the system information through broadcast and/or multicast and/or unicast of the network device.

In an implementation of the present disclosure, the terminal device can receive the first indication information, and determine the first resource according to the first indication information. More specifically, the terminal device can receive the first indication information sent by the network device. Optionally, the terminal device can receive the first indication information sent by other network devices. Implementations of the present disclosure are not limited thereto.

In some implementations, the first indication information is used for indicating location of the resource for sending the system information, or the first indication information is used for indicating starting location of the resource for sending the system information, and at least one of time domain width of a resource block and frequency domain width of the resource block. Determining the first resource according to the first indication information by the terminal device includes: determining, by the terminal device, the first resource according to the location of the resource for sending the system information indicated by the first indication information; or determining, by the terminal device, the first resource according to the starting location of the resource for sending the system information, and at least one of the time domain width of the resource block and the frequency domain width of the resource block, indicated by the first indication information.

Specifically, when the first indication information is used for indicating the starting location of the resource for sending the system information, and at least one of the time domain width of the resource block and the frequency domain width of the resource block, the terminal device can determine a time domain resource for receiving the system information according to the starting location of the resource and the time domain width of the resource block. The terminal device can determine a frequency domain resource for receiving the system information according to the starting location of the resource and the frequency domain width of the resource block. The terminal device can determine a time domain and frequency domain resource for receiving the system information according to the starting location of the resource, the time domain width of the resource block and the frequency domain width of the resource block.

Optionally, the first indication information which indicates the resource for sending the system information may indicate locations of several resources, and the sizes of the locations of the several resources may vary. Optionally, the first indication information may indicate that the resource for sending the system information is a specific resource selected from a set of resources. Implementations of the present disclosure are not limited thereto.

In some implementations, the first indication information is further used for indicating a transmission periodicity for sending the system information, and/or the first indication information is further used for indicating content information contained in the system information.

For example, the first indication information may also indicate a transmission periodicity for the network device to send an MIB, or a transmission periodicity for an SIB1. Optionally, the first indication information may indicate transmission periodicity for all system information. The transmission periodicity for multiple pieces of system information may be the same or different. Implementations of the present disclosure are not limited thereto. In this way, the at least one terminal device may periodically receive the corresponding system information according to the transmission periodicity of the system information. For example, the first indication information may also indicate that the MIB includes such content information as system frame number, downlink system bandwidth, Physical Hybrid ARQ Indicator Channel (PHICH), etc. For example, the content information may be indicated by identification information. For another example, the first indication information may also indicate that the SIB1 includes Public Land Mobile Network Identity (PLMN-ID), Temporal Access Control (TAC), Cell ID (Cell ID), cell selection information, etc. For another example, the first indication information may also indicate that the SIB includes Automatic Call Back (ACB), and common access resources, etc.

In some implementations, the first indication information is further used for indicating location of a resource for sending control information of the system information, or the first indication information is used for indicating starting location of a resource for sending control information of the system information, and at least one of time domain width of a resource block and frequency domain width of the resource block. Determining the first resource according to the first indication information by the terminal device includes: determining, by the terminal device, the resource for sending the control information of the system information according to the location of the resource for sending the control information of the system information indicated by the first indication information, or according to the starting location of the resource for sending the control information of the system information, and at least one of the time domain width of the resource block and the frequency domain width of the resource block, indicated by the first indication information; receiving, by the terminal device, the control information of the system information on the resource for sending the control information of the system information; and determining, by the terminal device, the first resource according to a resource indicated by the control information of the system information.

Optionally, the first indication information which indicates the resource for sending the control information of the system information may indicate locations of several resources, and the sizes of the locations of the several resources may vary. Optionally, the first indication information may indicate that the resource for sending the control information of the system information is a specific resource selected from a set of resources. Implementations of the present disclosure are not limited thereto.

In some implementations, the control information of the system information is further used for indicating a transmission periodicity for sending the system information, and/or the control information of the system information is further used for indicating content information contained in the sent system information. Of course, the control information of the system information can also be used for indicating the order in which the system information is sent, and the implementations of the present disclosure are not limited thereto.

In some implementations, the control information of the system information is further used for indicating whether the at least one terminal device needs to receive the system information on the resource for sending the system information. When the control information of the system information indicates that the terminal device needs to receive the system information on the resource for sending the system information, the terminal device receives the system information on the resource for sending the system information. When the control information of the system information indicates that the terminal device does not need to receive the system information on the resource for sending the system information, the terminal device does not need to receive the system information on the resource for sending the system information.

In some implementations, receiving the first indication information by the terminal device includes receiving the first indication information through synchronization information by the terminal device.

In some implementations, the first indication information is further used for indicating whether the terminal device needs to receive the system information on the first resource. Determining the first resource according to the first indication information by the terminal device includes: determining the first resource according to the first indication information by the terminal device when the first indication information is further used for indicating that the terminal device needs to receive the system information on the first resource.

In some implementations, before receiving the system information on the configured first resource by the terminal device, the method further includes: determining the first resource according to preconfigured information by the terminal device.

In an implementation of the present disclosure, the preconfigured information may be specified in a protocol or determined by negotiation between the network device and the at least one terminal device. Implementations of the present disclosure are not limited thereto.

In some implementations, the preconfigured information is used for indicating a calculation method of the first resource. Determining the first resource according to the preconfigured information by the terminal device includes: determining, by the terminal device, the first resource according to the calculation method of the first resource indicated by the preconfigured information.

In some implementations, the preconfigured information is used for indicating a calculation method of the resource for sending control information of the system information. Determining the first resource according to the preconfigured information by the terminal device includes: calculating, by the terminal device, the resource for sending the control information of the system information according to the calculation method of the resource for sending the control information of the system information indicated by the preconfigured information; receiving, by the terminal device, the control information of the system information on the resource for sending the control information of the system information; and determining, by the terminal device, the first resource according to a resource indicated by the control information of the system information.

In some implementations, receiving system information on the configured first resource by the terminal device includes: receiving the system information simultaneously or sequentially by the terminal device according to its own supported bandwidth.

In an implementation of the present disclosure, when the bandwidth supported by the terminal device is relatively wide, and the first resource is a resource with a relatively wide bandwidth, if the network device sends multiple pieces of system information on the first resource, the terminal device can simultaneously receive the multiple pieces of system information on the first resource. When the bandwidth supported by the terminal device is relatively narrow, and the first resource is a relatively wide resource, if the network device sends multiple pieces of system information on the first resource, the terminal device can sequentially receive the multiple pieces of system information on the first resource. Specifically, the multiple pieces of system information may be received according to an order indicated by the second indication information.

In some implementations, the system information includes second indication information, and the second indication information is used for indicating to the terminal device resources for receiving other system information than the system information. After receiving the system information on the configured first resource by the terminal device, the method further includes: receiving, by the terminal device, the other system information on the resources for receiving the other system information than the system information according to the second indication information.

In an implementation of the present disclosure, when the system information is part of the system information sent by the network device, the network device can indicate, in the system information, the resource for the remaining system information not sent to the terminal device. In this way, the terminal device receives the system information, determines the resource for the remaining system information according to the second indication information included in the system information. The other system information herein can be understood as the remaining system information that the network device has not sent to the terminal device yet.

In some implementations, the second indication information is further used for indicating an order in which the terminal device receives the other system information, and/or the second indication information is further used for indicating content information of the other system information.

In an implementation of the present disclosure, when the system information is part of the system information sent by the network device, the network device can indicate, in the system information through the second indication information, the transmission sequence for the remaining system information not sent to the terminal device. In this way, when receiving the system information, the terminal device determines the reception sequence for the remaining system information according to the second indication information included in the system information. The terminal device receives the remaining system information according to the reception sequence. The other system information herein can be understood as the remaining system information that the network device has not sent to the terminal device yet.

In some implementations, the system information is a master information block.

Optionally, the master information block is further used for indicating whether the terminal device needs to receive the remaining system information not sent on the resource for sending the system information.

In a third aspect, an apparatus for transmitting system information is provided for performing the method in the first aspect or any possible implementation mode of the first aspect described above. Specifically, the apparatus includes units for performing the method in the first aspect or any possible implementation mode of the first aspect described above.

In a fourth aspect, an apparatus for transmitting system information is provided for performing the method in the second aspect or any possible implementation mode of the second aspect described above. Specifically, the apparatus includes units for performing the method in the second aspect or any possible implementation mode of the second aspect described above.

In a fifth aspect, an apparatus for transmitting system information is provided. The apparatus may include a transceiver and a processor. The apparatus may perform the method of the first aspect or the method in any one of optional implementations of the first aspect.

In a six aspect, a system for transmitting system information is provided. The system includes: the apparatus of the third aspect or the apparatus in any one of optional implementations of the third aspect, and the apparatus of the fourth aspect or the apparatus in any one of optional implementations of the fourth aspect.

In a seventh aspect, an apparatus for transmitting system information is provided. The apparatus may include a transceiver and a processor. The apparatus may perform the method of the second aspect or the method in any one of optional implementations of the second aspect.

In an eighth aspect, a computer readable medium is provided. The computer readable medium stores program codes executable by a network device, and the program codes include instructions for executing the method of the first aspect or the method in any one of the various implementations of the first aspect.

In a ninth aspect, a computer readable medium is provided. The computer readable medium stores program codes executable by a terminal device, and the program codes include instructions for executing the method of the second aspect or the method in any one of the various implementations of the second aspect.

DETAILED DESCRIPTION

It should be understood that the technical schemes of the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS) system, an LTE system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system, or other communication systems that may emerge in future.

It should also be understood that in implementations of the present disclosure, a terminal device may be referred to as a User Equipment (UE), a terminal equipment, a Mobile Station (MS), a Mobile Terminal, or a terminal device in the future 5G network, etc. The terminal device may communicate with one or more core networks via a Radio Access Network (RAN). For example, the terminal may be a mobile phone (or called "cellular" phone) or a computer with a mobile terminal, etc. For another example, the terminal may be a portable, pocket-sized, hand-hold, built-in-computer, or vehicle-mounted mobile device that exchanges voice and/or data with a wireless access network.

A network device may be used for communicating with mobile devices. The network device may be a Base Transceiver Station (BTS) in Global System of Mobile Communication (GSM) or Code Division Multiple Access (CDMA), or a base station (NodeB, NB) in Wideband Code Division Multiple Access (WCDMA), or an Evolution Node B (eNB or eNodeB) in LTE, or a relay station or access point, or a vehicle-mounted device or wearable device, or an access network device in future 5G network.

In an implementation of the present disclosure, a signal for transmitting system information, which a terminal device may send to a network device may be a preamble. For example, the signal for transmitting system information may be sent on a Physical Random Access Channel (PRACH). After the network device receives the signal, for transmitting system information, sent by the terminal device, the terminal device may send a response (Random Access Response, RAR) for transmitting system information to the network device, where the response for transmitting system information is used for notifying that the terminal device has successfully accessed.

Figures 1, 2, 3:
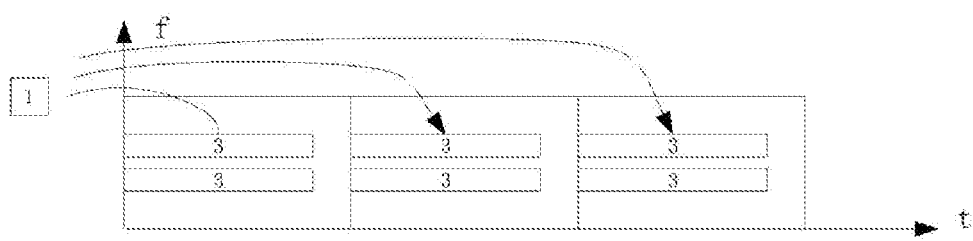
FIG. 1 is a schematic diagram of a method for transmitting system information according to an implementation of the present disclosure.
FIG. 2 is a schematic diagram of another method for transmitting system information according to an implementation of the present disclosure.
FIG. 3 is a schematic diagram of another method for transmitting system information according to an implementation of the present disclosure.

FIG. 1 illustrates a schematic flowchart of a method 100 for transmitting system information according to an implementation of the present disclosure. FIG. 1 illustrates acts or operations of a method for transmitting system information provided in an implementation of the present disclosure. However, these acts or operations are merely examples, and other operations or variations of the operations shown in FIG. 1 may be performed in implementations of the present disclosure. The method 100 includes acts S110 and S120.

In act S110, a network device determines a resource for sending system information.

In act S120, the network device sends the system information on the resource for sending the system information.

FIG. 2 illustrates a schematic flowchart of a method 200 for transmitting system information according to an implementation of the present disclosure. FIG. 2 illustrates acts or operations of a method for transmitting system information provided in an implementation of the present disclosure. However, these acts or operations are merely examples, and other operations or variations of the operations shown in FIG. 2 may be performed in implementations of the present disclosure. The method 200 includes act S210.

In act S210, a terminal device receives system information on a configured first resource.

It should be understood that the first resource in act S210 may be the resource for sending the system information in act S110.

Therefore, the network device can determine the resource for sending the system information, and the network device can send the system information on the determined resource for sending the system information. In this way, the terminal device can receive, according to its own capability, the system information on the resource where the network device sends the system information. For example, if the terminal device supports relatively wide bandwidth, the terminal device can obtain the system information through once receiving on the resource where the network device sends the system information. If the terminal device supports relatively narrow bandwidth, the terminal device can sequentially receive the system information sent by the network device on the bandwidth supported by the terminal device.

Optionally, act S210 includes: receiving the system information simultaneously or sequentially by the terminal device according to its own supported bandwidth. When the bandwidth supported by the terminal device is relatively wide, and the first resource is a resource with a relatively wide bandwidth, if the network device sends multiple pieces of system information on the first resource, the terminal device can simultaneously receive the multiple pieces of system information on the first resource. When the bandwidth supported by the terminal device is relatively narrow, and the first resource is a relatively wide resource, if the network device sends multiple pieces of system information on the first resource, the terminal device can sequentially receive the multiple pieces of system information on the first resource. Specifically, the multiple pieces of system information may be sequentially received according to second indication information.

Optionally, the system information may be all system information that the network device needs to send to at least one terminal device, or may be part of system information that the network device sends to the at least one terminal device. For example, the system information may be an MIB in the LTE. In other words, a resource determined by the network device may be used for sending part or all of system information, such as all or part of system information of SIB1, SIB2, SIB3, SIB4, SIB5, SIB6, SIB7, SIB8, etc. in LTE. Optionally, the system information may be all or part of system information in a future communication system. The classification of system information in the future communication system may adopt the classification manner of system information in the LTE system, or may adopt other classification manners of system information. Implementations of the present disclosure are not limited thereto. The system information in the future communication system includes the content contained in the system information in the LTE, but is not limited to the content contained in the system information in the LTE, and may also include other content. Implementations of the present disclosure are not limited thereto. It should be understood that the terminal device in act S210 may be any one terminal device among the at least one terminal device.

The manners in which the terminal device determines the first resource may be divided into two parts. The first part is that the first resource is determined according to first indication information that is sent. The second part is that the network device determines the resource for sending the system information according to preconfigured information, and the terminal device determines the first resource for receiving the system information according to the preconfigured information.

In the first part, the network device sends the first indication information to the terminal device, and the terminal device determines the first resource according to the first indication information. The content related to the first part is described below.

In an optional implementation, before act S110, the method 100 further includes: sending the first indication information to the at least one terminal device by the network device, wherein the first indication information is used for the at least one terminal device to determine the resource for sending the system information. Before act S210, the method 200 further includes: receiving the first indication information by the terminal device, and determining the first resource according to the first indication information by the terminal device. Specifically, the terminal device receives the first indication information sent by the network device. For example, as shown in FIG. 3, the box labeled with "1" in FIG. 3 represents a resource for sending the first indication information, such as a resource for synchronization information. For example, the first indication information may be sent through system information, and the boxes labeled with "3" in FIG. 3 represent the resources for sending the system information to the at least one terminal device by the network device, and the resources where the terminal device receives the system information.

Optionally, the network device sends the first indication information to the at least one terminal device through the synchronization information, the terminal device receives the first indication information through the synchronization information.

Specifically, in order to enable the at least one terminal device to receive the system information on correct resources, the network device may use the first indication information to notify the at least one terminal device of the resource where the network device sends the system information. For example, the first indication information may be sent to the at least one terminal device through the synchronization information, and the at least one terminal device determines, according to the first indication information, the resource for receiving the system information. In this way, the at least one terminal device can receive, according to the bandwidth supported by itself and the first indication information, the system information that the network device sends through broadcast and/or multicast and/or unicast, thereby improving the flexibility of the network device for sending the system information and the flexibility of the at least one terminal device for receiving the system information.

Optionally, the first indication information is further used for indicating whether the at least one terminal device needs to receive the system information on the resource for sending the system information. Determining the first resource according to the first indication information by the terminal device includes: determining the first resource according to the first indication information by the terminal device when the first indication information is further used for indicating that the at least one terminal device needs to receive the system information on the first resource.

It should be understood that control information of the system information or the master information block can also be used for indicating whether the at least one terminal device needs to receive the system information on the resource for sending the system information.

In an optional implementation, the first indication information is used for indicating location of the resource where the network device sends the system information, or the first indication information is used for indicating starting location of the resource where the network device sends the system information, and at least one of time domain width of a resource block and frequency domain width of the resource block. Determining the first resource according to the first indication information by the terminal device includes: determining, by the terminal device, the first resource according to the location of the resource for sending the system information indicated by the first indication information; or determining, by the terminal device, the first resource according to the starting location of the resource for sending the system information, and at least one of the time domain width of the resource block and the frequency domain width of the resource block, indicated by the first indication information. Specifically, the first indication information may be used to indicate the location of the resource where the network device sends the system information, and the terminal device determines, according to the resource where the network device sends the system information and which is indicated by the first indication information, the first resource for receiving. When the first indication information is used for indicating the starting location of the resource where the network device sends the system information, and at least one of the time domain width of the resource block and the frequency domain width of the resource block, the terminal device can determine a time domain resource for receiving the system information according to the starting location of the resource and the time domain width of the resource block, and the time domain resource can be considered as the first resource. The terminal device can determine a frequency domain resource for receiving the system information according to the starting location of the resource and the frequency domain width of the resource block, and the frequency domain resource may be considered as the first resource. The terminal device may determine a time domain and frequency domain resource for receiving the system information according to the starting location of the resource, the time domain width of the resource block and the frequency domain width of the resource block, and the time domain and frequency domain resource may be considered as the first resource.

Optionally, the first indication information which indicates the resource where the network device sends the system information may indicate several possible resource locations, and the capacity of different resource in different location may vary. Optionally, the first indication information may indicate that the resource where the network device sends the system information is a specific resource selected from a set of resources. Implementations of the present disclosure are not limited thereto.

In an optional implementation, the first indication information is further used for indicating a transmission periodicity for sending the system information, and/or the first indication information is further used for indicating content information contained in the system information. Particularly, the first indication information is further used for indicating a transmission periodicity for the network device to send the system information.

For example, the first indication information may also indicate a transmission periodicity for the network device to send an MIB, or a transmission periodicity for an SIB1. Optionally, the first indication information may indicate transmission periodicity for all system information. Specifically, the first indication information may also indicate transmission periodicity for all system information or part of system information in a future network system. The transmission periodicity of multiple pieces of system information may be the same or different, but implementations of the present disclosure are not limited thereto. In this way, the at least one terminal device may periodically receive the corresponding system information according to the transmission periodicity of the system information. For example, the first indication information may also indicate that the MIB includes such content information as system frame number, downlink system bandwidth, Physical Hybrid ARQ Indicator Channel (PHICH), etc. For example, the content information may be indicated by identification information. For another example, the first indication information may also indicate that the SIB1 includes Public Land Mobile Network Identity (PLMN-ID), TAC, Cell ID, cell selection information, etc. For another example, the first indication information may also indicate that the SIB includes ACB, common access resources, etc.

Figure 4:
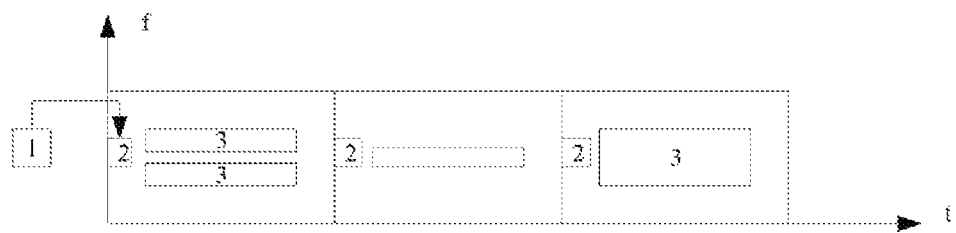
FIG. 4 is a schematic diagram of another method for transmitting system information according to an implementation of the present disclosure.

In an optional implementation, the first indication information is further used for indicating location of the resource where the network device sends control information of the system information, or the first indication information is used for indicating starting location of the resource where the network device sends control information of the system information, and at least one of time domain width of a resource block and frequency domain width of the resource block. Determining the first resource according to the first indication information by the terminal device includes: determining, by the terminal device, the resource for sending the control information of the system information according to the location of the resource for sending the control information of the system information indicated by the first indication information, or according to the starting location of the resource for sending the control information of the system information, and at least one of the time domain width of the resource block and the frequency domain width of the resource block, indicated by the first indication information; receiving, by the terminal device, the control information of the system information on the resource for sending the control information of the system information; and determining, by the terminal device, the first resource according to a resource indicated by the control information of the system information. For example, as shown in FIG. 4, the box labeled with "1" represents a resource for sending the first indication information, such as a resource for synchronization information. The boxes labeled with "2" represent the resources where the network device sends the control information of the system information and which are indicated by the first indication information. The boxes labeled with "3" represent the resources for sending the system information indicated by the control information of the system information.

Specifically, the first indication information may also indicate the resource where the network device sends the control information of the system information. In this way, the terminal device receives, according to the indication of the first indication information, the control information of the system information on the resource for sending the control information of the system information. When the terminal device receives the control information of the system information, the resource for receiving the system information can be determined according to the resource indicated by the control information of the system information, and then the system information can be received according to the determined resource for receiving the system information.

Optionally, the first indication information which indicates the resource where the network device sends the configuration information of the system information may indicate several different resource locations, and the capacity of different resource in different location may vary. Optionally, the first indication information may indicate that the resource where the network device sends the control information of the system information is a specific resource selected from a set of resources. Implementations of the present disclosure are not limited thereto.

In an optional implementation, the control information of the system information is further used for indicating a transmission periodicity for sending the system information, and/or the control information of the system information is further used for indicating content information contained in the sent system information.

In the second part, the network device determines the resource for sending the system information according to preconfigured information, and the terminal device determines the first resource for receiving the system information according to the preconfigured information. The first resource here may be the resource for sending system information. The content related to the second part is described below.

In an optional implementation, act S110 may include determining the resource for sending the system information according to preconfigured information by the network device. Before act S210, the method 200 may include determining the first resource according to preconfigured information by the terminal device. The preconfigured information may be specified in a protocol or determined by negotiation between the network device and the at least one terminal device. Implementations of the present disclosure are not limited thereto.

Figure 5:
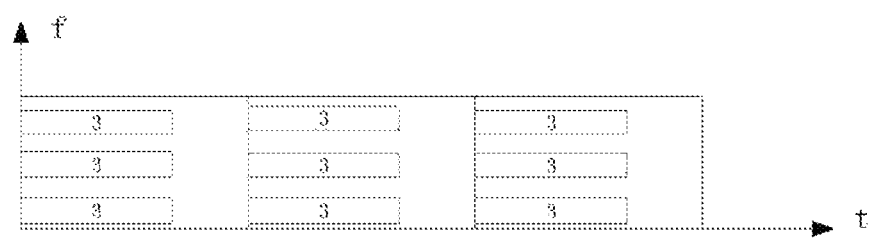
FIG. 5 is a schematic diagram of another method for transmitting system information according to an implementation of the present disclosure.

In an optional implementation, the preconfigured information is used for indicating a calculation method of the resource where the network device sends the system information. The network device calculates the resource, where the network device sends the system information, according to the method which is indicated by the preconfigured information and which is used for calculating the resource where the network device sends the system information. Determining the first resource according to the preconfigured information by the terminal device includes: determining, by the terminal device, the first resource according to the calculation method of the first resource indicated by the preconfigured information. For example, as shown in FIG. 5, the boxes labeled with "3" in FIG. 5 represent the resources where the network device sends the system information. The resources where the network device sends the system information are determined according to the preconfigured information. The terminal device can receive the system information on these resources. Specifically, the terminal device can receive the system information on these resources according to the bandwidth supported by it.

Figure 6:
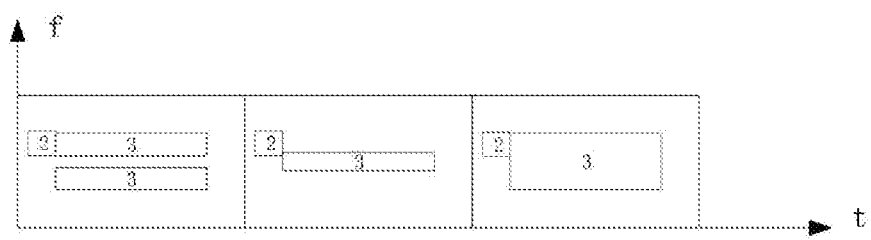
FIG. 6 is a schematic diagram of another method for transmitting system information according to an implementation of the present disclosure.

In an optional implementation, the preconfigured information is used for indicating a calculation method of the resource where the network device sends control information of the system information. The network device calculates the resource, where the network device sends the control information of the system information, according to the method which is indicated by the preconfigured information and which is used for calculating the resource where the network device sends the control information of the system information. Determining the first resource according to the preconfigured information by the terminal device includes: calculating, by the terminal device, the resource for sending the control information of the system information according to the calculation method of the resource for sending the control information of the system information indicated by the preconfigured information; receiving, by the terminal device, the control information of the system information on the resource for sending the control information of the system information; and determining, by the terminal device, the first resource according to a resource indicated by the control information of the system information. For example, as shown in FIG. 6, the boxes labeled with "2" in FIG. 6 represent resources for sending and receiving the control information of the system information. The boxes labeled with "3" in FIG. 6 represent resources for sending and receiving the system information. The network device determines, according to the preconfigured information, the resource where the network device sends the control information of the system information. The network device determines, according to the resource for sending the system information indicated by the control information of the system information, the resource where the network device sends the system information. The terminal device determines, according to the preconfigured information, the resource for receiving the control information of the system information. The terminal device receives the system information on the first resource which is used for receiving the system information and indicated by the control information of the system information.

In an optional implementation, the system information includes second indication information, and the second indication information is used for indicating resources for the at least one terminal device to receive other system information than the system information. After act S210, the method 200 further includes: receiving, by the terminal device, the other system information on the resources for receiving the other system information than the system information according to the second indication information.

Specifically, when the system information is part of the system information sent by the network device, the network device can indicate, in the system information, the resource for the remaining system information not sent to the at least one terminal device. In this way, the at least one terminal device receives the system information, determines the resource for the remaining system information according to the second indication information included in the system information. The other system information herein can be understood as the remaining system information that the network device has not sent to the at least one terminal device yet.

In an optional implementation, the second indication information is further used for indicating an order in which the terminal device receives the other system information, and/or the second indication information is further used for indicating content information of the other system information. After act S210, the method 200 further includes: receiving, by the terminal device, the other system information in the sequence for receiving the other system information than the system information according to the indication of the second indication information.

Specifically, when the system information is part of the system information sent by the network device, the network device can indicate, in the system information through the second indication information, the transmission sequence for the remaining system information not sent to the terminal device. In this way, when receiving the system information, the terminal device determines the reception sequence for the remaining system information according to the second indication information included in the system information. The terminal device receives the remaining system information according to the reception sequence. The other system information herein can be understood as the remaining system information that the network device has not sent to the at least one terminal device yet.

In an optional implementation, the system information is a master information block. If the system information is the master information block, since the master information block includes the most important system information, such as system bandwidth, system frame number, selection information, initial access information, etc., the master information block may also include information of a base station. In this way, the at least one terminal device can be ensured to normally receive the master information block.

It should be understood that in FIGS. 3 to 6, the x axis represents the time domain (t), and the y axis represents the frequency domain (f).

Figure 7:
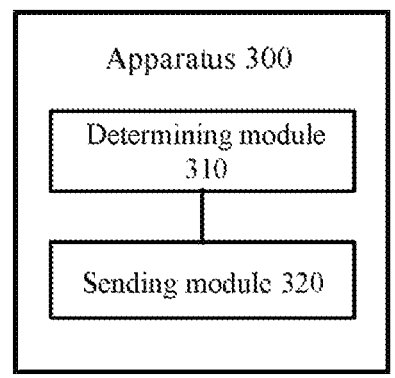
FIG. 7 is a schematic diagram of a device for transmitting system information according to an implementation of the present disclosure.

FIG. 7 is a schematic block diagram of an apparatus 300 for transmitting system information according to an implementation of the present application. The apparatus may be a network device in the method 100. As shown in FIG. 7, the apparatus 300 includes a determining module 310 and a sending module 320.

The determining module 310 is used for determining a resource for sending the system information.

The sending module 320 is used for sending the system information on the resource for sending the system information.

In an optional implementation, the sending module 320 is further used for sending first indication information to at least one terminal device before sending the system information on the resource for sending the system information, wherein the first indication information is used for the at least one terminal device to determine the resource for sending the system information.

In an optional implementation, the first indication information is used for indicating location of the resource for sending the system information, or the first indication information is used for indicating starting location of the resource for sending the system information, and at least one of time domain width of a resource block and frequency domain width of the resource block.

In an optional implementation, the first indication information is further used for indicating a transmission periodicity for sending the system information, and/or the first indication information is further used for indicating content information contained in the system information.

In an optional implementation, the first indication information is further used for indicating location of a resource for sending control information of the system information, or the first indication information is used for indicating starting location of a resource for sending control information of the system information, and at least one of time domain width of a resource block and frequency domain width of the resource block.

In an optional implementation, the control information of the system information is further used for indicating a transmission periodicity for sending the system information, and/or the control information of the system information is further used for indicating content information contained in the sent system information.

In an optional implementation, the sending module 320 is specifically used for sending the first indication information to the at least one terminal device through synchronization information.

In an optional implementation, the first indication information is further used for indicating whether the at least one terminal device needs to receive the system information on the resource for sending the system information.

In an optional implementation, the determining module 310 is specifically used for determining the resource for sending the system information according to preconfigured information.

In an optional implementation, the preconfigured information is used for indicating a calculation method of the resource for sending the system information.

In an optional implementation, the preconfigured information is used for indicating a calculation method of the resource for sending control information of the system information.

In an optional implementation, the system information includes second indication information, and the second indication information is used for indicating resources for the at least one terminal device to receive other system information than the system information.

In an optional implementation, the second indication information is further used for indicating an order in which the at least one terminal device receives the other system information, and/or the second indication information is further used for indicating content information of the other system information.

In an optional implementation, the system information is a master information block.

Figure 8:
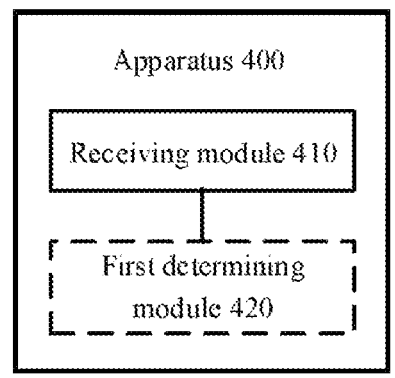
FIG. 8 is a schematic diagram of another device for transmitting system information according to an implementation of the present disclosure.

FIG. 8 is a schematic block diagram of an apparatus 400 for transmitting system information according to an implementation of the present application. The apparatus may be a terminal device in the method 200. As shown in FIG. 8, the apparatus 400 includes a receiving module 410 and a first determining module 420.

The receiving module 410 is used for receiving system information on a configured first resource.

In an optional implementation, the receiving module 410 is further used for receiving first indication information before receiving the system information on the configured first resource, and the first determining module 420 is used for determining the first resource according to the first indication information.

In an optional implementation, the first indication information is used for indicating location of the resource for sending the system information, or the first indication information is used for indicating starting location of the resource for sending the system information, and at least one of time domain width of a resource block and frequency domain width of the resource block. The first determining module 420 is specifically used for determining the first resource according to the location of the resource for sending the system information indicated by the first indication information. Optionally, the first determining module 420 is further specifically used for determining the first resource according to the starting location of the resource for sending the system information, and at least one of the time domain width of the resource block, and the frequency domain width of the resource block, indicated by the first indication information.

In an optional implementation, the first indication information is further used for indicating a transmission periodicity for sending the system information, and/or the first indication information is further used for indicating content information contained in the system information.

In an optional implementation, the first indication information is further used for indicating location of a resource for sending control information of the system information, or the first indication information is used for indicating starting location of a resource for sending control information of the system information, and at least one of time domain width of a resource block and frequency domain width of the resource block. The first determining module 420 is specifically used for determining the resource for sending the control information of the system information according to the location of the resource for sending the control information of the system information indicated by the first indication information, or according to the starting location of the resource for sending the control information of the system information, and at least one of the time domain width of the resource block and the frequency domain width of the resource block, indicated by the first indication information. The receiving module 410 is further used for receiving the control information of the system information on the resource for sending the control information of the system information. The first determining module 420 is specifically used for determining the first resource according to a resource indicated by the control information of the system information.

In an optional implementation, the control information of the system information is further used for indicating a transmission periodicity for sending the system information, and/or the control information of the system information is further used for indicating content information contained in the sent system information.

In an optional implementation, the receiving module 410 is specifically used for receiving the first indication information through synchronization information.

In an optional implementation, the first indication information is further used for indicating whether the apparatus needs to receive the system information on the first resource. The first determining module 420 is specifically used for determining the first resource according to the first indication information when the first indication information is further used for indicating that the apparatus needs to receive the system information on the first resource.

In an optional implementation, the apparatus 400 further includes a second determining module, used for determining the first resource according to preconfigured information before receiving the system information on the configured first resource.

In an optional implementation, the preconfigured information is used for indicating a calculation method of the first resource, the second determining module is specifically used for determining the first resource according to the calculation method of the first resource indicated by the preconfigured information.

In an optional implementation, the preconfigured information is used for indicating a calculation method of the resource for sending control information of the system information. The second determining module is further specifically used for calculating the resource for sending the control information of the system information according to the calculation method of the resource for sending the control information of the system information indicated by the preconfigured information. The receiving module 410 is further used for receiving the control information of the system information on the resource for sending the control information of the system information. The second determining module is specifically used for determining the first resource according to a resource indicated by the control information of the system information.

In an optional implementation, the receiving module 410 is further specifically used for receiving the system information simultaneously or sequentially according to bandwidth supported by the apparatus 400.

In an optional implementation, the system information includes second indication information, and the second indication information is used for indicating resources for the apparatus 400 to receive other system information than the system information. The receiving module 410 is further used for receiving the other system information on the resources for receiving the other system information than the system information according to the second indication information after receiving the system information on the configured first resource.

In an optional implementation, the second indication information is further used for indicating an order in which the apparatus 400 receives the other system information, and/or the second indication information is further used for indicating content information of the other system information.

In an optional implementation, the system information is a master information block.

Figure 9:
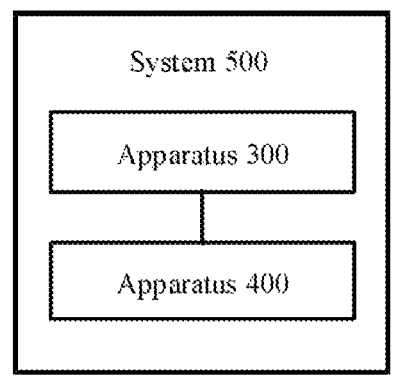
FIG. 9 is a schematic diagram of a system for transmitting system information according to an implementation of the present disclosure.

FIG. 9 shows a schematic diagram of a system 500 for transmitting system information provided by an implementation of the present disclosure. The system 500 includes the apparatus 300 and the apparatus 400.

Figure 10:
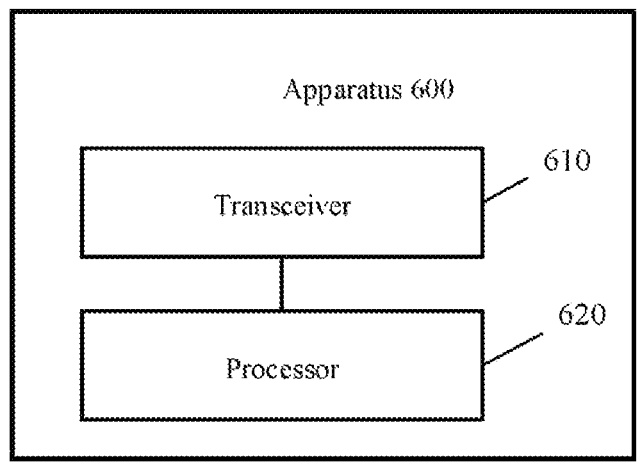
FIG. 10 is a schematic diagram of a device for transmitting system information according to an implementation of the present disclosure.

FIG. 10 is a schematic block diagram of an apparatus 600 for transmitting system information according to an implementation of the present application. For example, the apparatus may be a network device in the method 100. As illustrated in FIG. 10, the apparatus 600 includes a transceiver 610 and a processor 620.

The processor 620 is used for determining a resource for sending the system information. The transceiver 610 is used for sending the system information on the resource for sending the system information.

It should be understood that the apparatus 600 may correspond to the network device in the method 100, and may realize corresponding functions of the network device in the method 100, which will not be described in detail herein for the sake of brevity.

Figure 11:
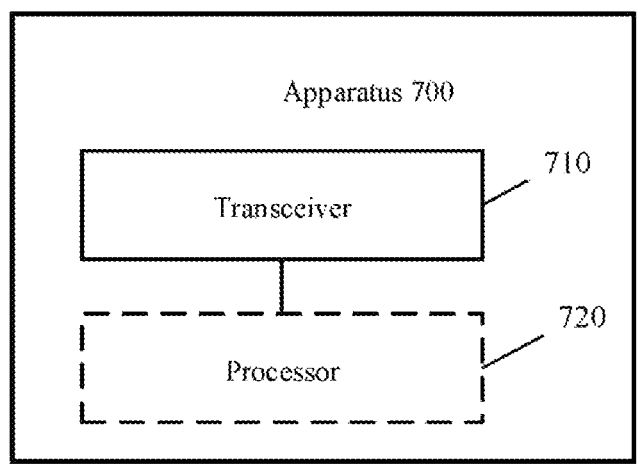
FIG. 11 is a schematic diagram of another device for transmitting system information according to an implementation of the present disclosure.

FIG. 11 is a schematic block diagram of an apparatus 700 for transmitting system information according to an implementation of the present application. The apparatus may be a terminal device in the method 200. As illustrated in FIG. 11, the apparatus 700 includes a transceiver 710 and a processor 720. The transceiver 710 is used for receiving system information on a configured first resource.

In an optional implementation, the transceiver 710 is further used for receiving first indication information before receiving the system information on the configured first resource. The processor 720 is used for determining the first resource according to the first indication information.

It should be understood that the apparatus 700 may correspond to the terminal device in the method 200, and may realize corresponding functions of the terminal device in the method 200, which will not be described in detail herein for the sake of brevity.

It should be understood that in implementations of the present disclosure, the processor 620, and the processor 720 may be central processing units (CPU), or other general purpose processors, digital signal processors (DSP), application specific integrated circuits (ASIC), field programmable gate arrays (FPGA) or other programmable logic devices, discrete gate or transistor logic devices, or discrete hardware components, etc. The general purpose processor may be a microprocessor, or the processor may be any conventional processor or the like.

The term "and/or" in this document is merely an association relationship describing associated objects, indicating that there may be three relationships, for example, A and/or B may indicate three situations: A alone, A and B, and B alone. In addition, the symbol "/" in this document generally indicates that objects of the former and the latter connected by "/" has an "or" relationship.

It should be understood that in various implementations of the present disclosure, values of sequence numbers of the above-mentioned processes do not indicate an order of execution, and the order of execution of various processes should be determined by their functions and internal logics, and should not constitute any limitation on the execution process of the implementations of the present disclosure.

Those of ordinary skill in the art will recognize that the exemplary elements and algorithm acts described in connection with the implementations disclosed herein can be realized in electronic hardware, or a combination of computer software and electronic hardware. Whether these functions are performed in hardware or software depends on specific applications and design constraints of a technical solution. Skilled in the art may use different methods to realize the described functions for each particular application, but such realization should not be considered to be beyond the scope of the present disclosure.

Those skilled in the art may clearly understand that for convenience and conciseness of description, the specific working process of the system, apparatus and unit described above may refer to the corresponding process in the aforementioned implementations of methods, and details are not described herein again.

In several implementations provided by the present disclosure, it should be understood that the disclosed systems, apparatus and methods may be implemented in other ways. For example, the apparatus implementations described above are only illustrative, for example, the division of the units is only a logical function division, and there may be other division manners in actual implementation, for example, multiple units or components may be combined or integrated into another system, or some features may be ignored or not executed. On the other hand, the mutual coupling or direct coupling or communication connection shown or discussed may be indirect coupling or communication connection through some interface, device or unit, and may be in electrical, mechanical or other forms.

The unit described as a separate unit may or may not be physically separated, and the component shown as a unit may or may not be a physical unit, i.e., it may be located in one place or may be distributed over multiple network units. Some or all of the units may be selected according to actual needs to achieve the purpose of the implementations.

In addition, various functional units in various implementations of the present disclosure may be integrated in one processing unit, or various units may be physically present separately, or two or more units may be integrated in one unit.

The functions may be stored in a computer readable storage medium if implemented in the form of software functional units and sold or used as a separate product. Based on this understanding, the technical solution of the present disclosure, in essence, or the part contributing to the prior art, or the part of the technical solution, may be embodied in the form of a computer software product stored in a storage medium, including a number of instructions for causing a computer device (which may be a personal computer, a server, or a network device) to perform all or part of the acts of the method described in various implementations of the present disclosure. The aforementioned storage medium includes U disk, mobile hard disk, read-only memory (ROM), random access memory (RAM), magnetic disk or optical disk, and other medium capable of storing program codes.

What are described above are merely exemplary implementations of the present disclosure, but the protection scope of the present disclosure is not limited thereto. Any person skilled in the art may easily conceive variations or substitutions within the technical scope disclosed by the present disclosure, which should be included within the protection scope of the present disclosure. Therefore, the protection scope of the present disclosure should be determined by the scope of the appended claims.

What we claim is:

1. A method for transmitting system information, comprising:
   determining, by a network device, a resource for sending the system information;
   sending, by the network device, the system information on the resource for sending the system information; and
   before sending, by the network device, the system information on the resource for sending system information, sending, by the network device, first indication information to a terminal device, wherein the first indication information is used for the terminal device to determine the resource for sending the system information, and wherein the first indication information is used for indicating a starting location of the resource where the network device sends the system information.

2. The method of claim 1, wherein the first indication information is further used for indicating a transmission periodicity for the network device to send the system information, or the first indication information is further used for indicating content information contained in the system information.

3. The method of claim 1, wherein determining, by the network device, the resource for sending the system information comprises:
determining, by the network device, the resource for sending the system information according to preconfigured information.

4. The method of claim 3, wherein the preconfigured information is used for indicating how to calculate and obtain a resource where the network device sends the system information.

5. A method for receiving system information, wherein the method comprises:
receiving, by a terminal device, system information on a configured first resource;
wherein before receiving, by the terminal device, the system information on the configured first resource, the method further comprises:
receiving, by the terminal device, first indication information; and
determining, by the terminal device, the configured first resource according to the first indication information, wherein the first indication information is used for indicating a starting location of the resource where the system information is sent.

6. The method of claim 5, wherein the first indication information is further used for indicating a transmission periodicity for sending the system information, or the first indication information is further used for indicating content information contained in the system information.

7. The method of claim 5, wherein the method further comprises:
before receiving, by the terminal device, the system information on the configured first resource, determining, by the terminal device, the configured first resource according to preconfigured information.

8. The method of claim 7, wherein the preconfigured information is used for indicating a calculation method of the configured first resource; and
wherein determining, by the terminal device, the configured first resource according to the preconfigured information comprises:
calculating and obtaining, by the terminal device, the configured first resource according to the preconfigured information.

9. An apparatus for receiving system information, comprising:
a transceiver, used for receiving system information on a configured first resource and receiving first indication information before receiving the system information on the configured first resource; and
a processor, used for determining the configured first resource according to the first indication information, wherein the first indication information is used for indicating a starting location of a resource where the system information is sent.

10. The apparatus of claim 9, wherein the first indication information is further used for indicating a transmission periodicity for sending the system information, or the first indication information is further used for indicating content information contained in the system information.

11. The apparatus of claim 9, wherein the apparatus further comprises:
a processor, used for determining the configured first resource according to preconfigured information before receiving the system information on the configured first resource.

12. The apparatus of claim 11, wherein the preconfigured information is used for indicating a calculation method of the configured first resource; and
wherein the processor is specifically used for calculating and obtaining the configured first resource according to the preconfigured information.

* * * * *